United States Patent [19]
Krinke

[11] Patent Number: 5,997,709
[45] Date of Patent: Dec. 7, 1999

[54] METHOD OF PROVIDING DIFFUSE RISERS ON A FRESNEL LENS DIE

[75] Inventor: Harlan L. Krinke, May Twp., Minn.

[73] Assignee: Minnesota Mining and Manufacturing Co., St. Paul, Minn.

[21] Appl. No.: 08/654,356

[22] Filed: May 28, 1996

[51] Int. Cl.⁶ .............................. C25D 5/02; C25D 5/48
[52] U.S. Cl. .............................. 205/22; 205/70; 205/79; 205/221; 205/223; 427/135; 427/277; 427/282
[58] Field of Search .............................. 205/70, 79, 149, 205/122, 221, 223; 427/133, 135, 271, 272, 277, 282

[56] References Cited

U.S. PATENT DOCUMENTS

| | | | |
|---|---|---|---|
| 3,712,707 | 1/1973 | Henkes, Jr. | 350/122 |
| 4,114,983 | 9/1978 | Maffitt et al. | 350/164 |
| 4,229,085 | 10/1980 | Yamada et al. | 353/75 |
| 4,334,966 | 6/1982 | Beach et al. | 204/25 |
| 4,781,801 | 11/1988 | Frisby | 204/25 |
| 5,453,880 | 9/1995 | Vanderwerf | 359/742 |

*Primary Examiner*—Kathryn L. Gorgos
*Assistant Examiner*—William T. Leader

[57] ABSTRACT

Methods of providing diffusing risers on a fresnel lens die having a plurality of optical facets, wherein adjacent optical facets are separated by a riser, the method including the steps of depositing a difflusing layer on the plurality of optical facets and the risers, and selectively removing the diffusing layer from the plurality of optical facets, wherein the diffusing layer remains substantially intact on the risers. The diffusing layer can be deposited in an electrolyte bath substantially free of grain refiners.

20 Claims, 1 Drawing Sheet

```
┌─────────────────────┐
│  DEPOSIT DIFFUSING  │
│  LAYER ON OPTICAL   │
│  FACETS AND RISERS  │
└──────────┬──────────┘
           │
           ▼
┌─────────────────────┐
│   RECUT OPTICAL     │
│ FACETS TO REMOVE    │
│  DIFUSSING LAYER    │
└─────────────────────┘
```

METHOD OF PROVIDING DIFFUSE RISERS ON A FRESNEL LENS DIE

FIELD OF THE INVENTION

The present invention relates to methods of providing diffuse risers on a fresnel lens die.

BACKGROUND OF THE INVENTION

Fresnel lenses include a series of optical facets, wherein each optical facet is separated by a riser. That construction provides for a substantially planar lens useful in many different applications.

One application in which fresnel lenses are particularly useful is in overhead projectors where they help to focus light from beneath the stage and onto the mirror elevated above the stage. In that application, however, light refracted through the risers in the fresnel lens causes what is commonly referred to as "stage glare." Stage glare typically affects the operator of the overhead projector by disrupting their view of the materials on the stage of the projector.

Attempts to reduce stage glare have involved providing a diffuse surface on the risers to diffuse the light refracted through those surfaces, thereby reducing the glare. The diffuse risers have been provided by chemically etching or attacking the finished lenses or the dies used to form the lenses. Typically the entire lens/die is treated, including the optical facets as well as the risers. After etching, the optical facets are recut or otherwise processed to restore them to a smooth, specular finish while the risers remain etched to provide the desired diffuse surface.

Etching the lens itself to provide diffusing risers adds significantly to the cost of the lens because each individual lens must be processed separately. Attempts at etching the dies used to form stamped fresnel lenses have reduced stage glare to some degree, but that approach is not compatible with all types of dies used to form lenses. That is particularly true where the materials used to form the dies are not susceptible to etching or, when etched, do not provide a surface that has the desired roughness or diffusing properties.

Thus, a need exists for a process of providing diffuse risers on a fresnel lens die.

SUMMARY OF THE INVENTION

The present invention includes methods of providing diffusing risers on a fresnel lens die having a plurality of optical facets, wherein adjacent optical facets are separated by a riser, the method including the steps of depositing a diffusing layer on the plurality of optical facets and the risers, and selectively removing the diffusing layer from the plurality of optical facets, wherein the diffusing layer remains substantially intact on the risers.

In a preferred method, the step of depositing a diffusing layer further comprises electrodepositing a layer of metal selected from the group consisting of copper, nickel, zinc, cobalt, tin, and combinations thereof.

It is also preferred that the bath used for electrodepositing the diffusing layer be substantially free of grain refiners. Grain refiners and other impurities can be removed from the bath by filtering, typically through activated charcoal and by allowing the temperature of the bath to rise to about 30° C. or higher, more preferably about 35° C. or higher, and even more preferably about 40° C. or higher.

It may also be helpful to control the rate at which the diffusing layer is deposited by controlling the current density used in the electrodeposition process. It is preferred to control the current density to about 0.022 amps/cm$^2$ (20 amps/ft$^2$) or less, more preferably about 0.016 amps/cm$^2$ (15 amps/ft$^2$) or less, and even more preferably about 0.011 amps/cm$^2$ (10 amps/ft$^2$) or less.

Methods according to the present invention may also include masking selected portions of the risers during the step of depositing the difflusing layer. The masking can be maintained throughout the deposition process or it may occur during only a portion of the process.

DETAILED DESCRIPTION OF THE INVENTION

Figures 1, 2:
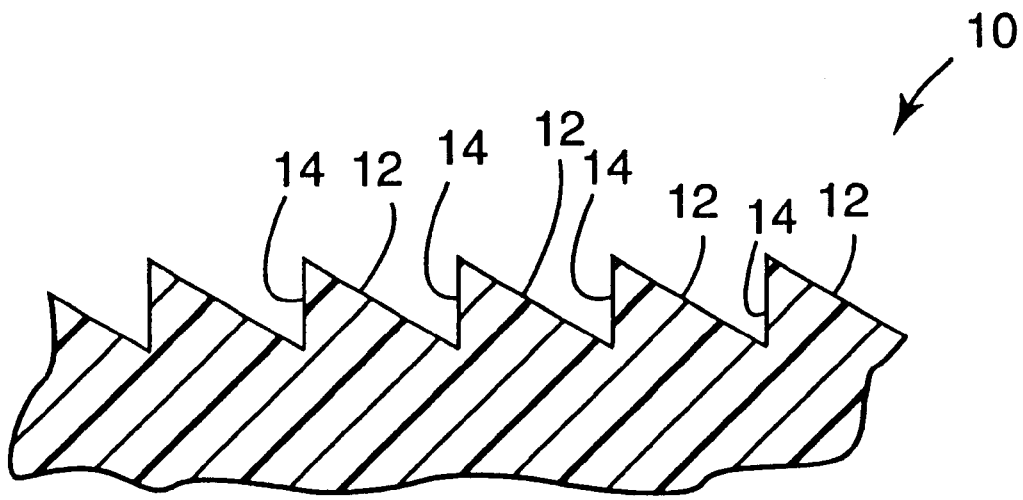
FIG. 1 is a cross-sectional schematic diagram of a fresnel lens depicting the optical facets and risers.
FIG. 2 is a schematic diagram of one process according to the present invention.

FIG. 1 is a cross-sectional diagram of a typical fresnel lens die 10 including optical facets 12 separated by risers 14. The risers 14 provide the vertical displacement between optical facets 12 that is required to produce a substantially planar lens from the die 10. The die 10 is typically manufactured from metals such as brass, copper, nickel, etc.

It will be understood that when the die 10 is a "negative" of the desired fresnel lens, it can be used directly to produce a fresnel lens or, alternatively, a "mother" can be electroformed from the die 10 and stampers (also a negative of the desired lens) can then be electroformed from the mothers to produce fresnel lenses. Where the die 10 is a "positive" of the desired fresnel lens, an electroformed copy will be a negative of the lens and can be used to form the desired fresnel lens.

After the die 10 is formed, the method according to the present invention can be used to provide the desired diffuse risers 14. The basic steps of the method are depicted in the block diagram of FIG. 2. First, a diffusing layer is deposited over the entire surface of the die 10, including the optical facets 12 and risers 14. Second, the optical facets 12 are processed to remove the diffusing layer and restore their specular finish while leaving the diffusing layer on the risers 14. The processing typically involves machining, or recutting, the optical facets 12 to remove the diffusing layer from them while leaving the diffusing layer on the risers 14.

The diffusing layer preferably is formed by electrodepositing a metal such as copper, nickel, zinc, tin, cobalt, etc. Combinations of one or more of the metals may also be used for the diffusing layer. The preferred method of depositing the diffusing layer is electroplating in a bath of electrolyte solution. It is preferred that the bath be substantially free of grain refiners to enhance the diffusing properties of the diffusing layer. If an electrolyte solution prepared with grain refiners is to be used, the bath can be filtered through activated carbon to remove the grain refiners.

Additionally, the bath can be heated or allowed to heat up during processing to cause degeneration of any grain refiners in the solution. The grain refiners degenerate at elevated temperatures because they are typically organic and, thus, susceptible to heat degeneration. Temperatures of the bath useful in connection with the present invention can range from about 30°0 C. or greater, more preferably about 35°0 C. or greater, and even more preferably about 40°0 C. or greater.

The current density of the plating process (i.e., amps/ plating area) can also play a role in the uniformity of the diffusing layer on the surface of the die. It is preferred that the current density be about 0.022 amps/cm$^2$ (20 amps/ft$^2$) or less, more preferably about 0.016 amps/cm$^2$ (15 amps/ft$^2$) or less, and even more preferably about 0.011 amps/cm$^2$ (10 amps/ft$^2$) or less. It will be understood that the desire for plating speed, i.e., rate of deposition, will typically be balanced with plating uniformity.

After the optical facets 12 have been processed, the die 10 can then be electroformed or otherwise duplicated to form mothers or stampers if desired. Alternatively, the die 10 itself could be used to form a fresnel lens.

In one preferred process, the diffusing layer deposited on the die 10 is matte copper. The process used to electrodeposit the matte copper is described in Example 1 below. The matte finish is provided by electroplating the die 10 in a bath that is substantially free of grain refiners. This produces a finish in the matte copper that is grainier than typically found in electrodeposited copper layers.

EXAMPLES

Features and advantages of the methods according to the present invention are further illustrated in the examples. It is recognized, however, that while the examples serve this purpose, the particular ingredients and amounts used, as well as other conditions and details, are not to be construed in a manner that would unduly limit the scope of this invention.

Example 1

A fresnel lens die master having a surface area of about 0.2 square meters manufactured of nickel was electroplated with a diffusing layer of matte copper according to the following procedure. An electroplating solution was prepared including copper sulfate (0.21 kg/liter of solution) (copper sulfate pentahydrate sold as Triangle Brand by Phelps Dodge Refining Corporation, El Paso, Tex.), sulfuric acid (0.061 kg/liter of solution) (96% pure, reagent grade), chloride (50 PPM), and a surfactant (1 liter of 10% Duponal ME per 757 liters of solution, available from DuPont). The balance of the solution was distilled water. The solution was filtered through a 1 micrometer filter and activated carbon to remove impurities before plating.

Before electroplating, the die was soaked in MEK/acetone solvent bath to remove oils and other contaminants on the surface of the die. The die was then power washed with a 20% Advanage™ cleaner solution (Advanage™ is available from Austin Diversified Products, Inc., Harvey, Ill.). After power washing, the die was maintained wet in a solution of 20% H$_2$SO$_4$ and 5% Advanage™ (balance distilled water) while it was mounted on the electroplating equipment.

To insure adhesion of the matte copper diffusing layer, the nickel die was first reverse plated for one minute at 25 amps with the die being the anode. Plating was then commenced after reversing polarity (i.e., the die was the cathode) and plating was carried out for about two hours at 20 amps for a total of 42 amphours. During plating, the electroplating solution was held at a temperature of 35° C., the die was rotated in the solution at 30 revolutions per minute, the electroplating solution was agitated with a mixer and the solution was recirculated through a 1 micrometer filter at a rate of 114 liters per minute.

The resulting die appeared uniformly coated with a layer of matte copper.

Example 2

A second nickel die essentially identical to the die used in Example 1 was electroplated under the same conditions as set out in Example 1, except that the electroplating was carried out at 42 amps for a total of 42 amp-hours.

The finished die did not appear as uniformly plated as the die produced according to Example 1.

Example 3

A copper die with a similar pattern and size as the nickel dies used in Examples 1 and 2 was plated with matte copper according to the process described in Example 1 with the following exceptions: the temperature of the bath during plating was 40° C.; the plating was carried out for about 40 minutes at 13–15 amps for a total of 11 amp-hours.

The resulting die had a uniform satin appearance. When a nickel electroform was produced using the die, virtually none of the matte copper was removed by the electroformed copy.

Example 4

A copper die was electroformed according to Example 3, with the following exception: during plating, a mask was placed with the logo of Minnesota Mining and Manufacturing Company ("3M") over the die for about one-half of the total plating time. The logo was provided of a magnetic material that adhered to the nickel substrate on which the copper surface was mounted. Because no further plating occurred in the area underneath the mask after its placement, the plating thickness was reduced in the area covered by the mask, resulting in the logo being transferred to the die. Lenses that were ultimately manufactured from this die also exhibited the logo when viewed from an angle, i.e., not normal to the plane of the lens.

Any patents, patent documents, and publications cited herein are incorporated by reference in their entirety, as if each were individually incorporated by reference. Various modifications and alterations of this invention will become apparent to those skilled in the art without departing from the scope of this invention, and it should be understood that this invention is not to be unduly limited to the illustrative embodiments set forth herein.

What is claimed is:

1. A method of providing diffusing risers on a fresnel lens die having a plurality of optical facets, wherein adjacent optical facets are separated by a riser, the method comprising the steps of:
   a) depositing a diffusing layer on the plurality of optical facets and the risers; and
   b) selectively removing the diffusing layer from the plurality of optical facets, wherein the diffusing layer remains substantially intact on the risers.

2. A method according to claim 1, wherein the step of depositing further comprises depositing the diffusing layer on a die having generally concentric optical facets.

3. A method according to claim 1, wherein the step of depositing further comprises depositing the diffusing layer on a die having generally parallel optical facets.

4. A method according to claim 1, wherein the step of depositing a diffusing layer further comprises electrodepositing a layer of metal chosen from the group consisting of copper, nickel, zinc, cobalt, tin, and combinations thereof.

5. A method according to claim 4, wherein the step of depositing further comprises electrodepositing the diffusing layer in a bath substantially free of grain refiners.

6. A method according to claim 5, further comprising a step of passing the bath through activated charcoal.

7. A method according to claim 5, further comprising a step of heating the bath to a temperature of about 30° C. or higher.

8. A method according to claim 5, further comprising a step of heating the bath to a temperature of about 35°0 C. or higher.

9. A method according to claim 5, further comprising a step of heating the bath to a temperature of about 40°0 C. or higher.

10. A method according to claim 1, further comprising masking selected portions of the risers during the step of depositing the diffusing layer.

11. A method according to claim 1, further comprising masking selected portions of the risers during a portion of the time during which the step of depositing is being performed.

12. A method according to claim 1, wherein the step of depositing further comprises passing electrical energy through the die having a current density of about 0.022 amps/cm$^2$ or less.

13. A method according to claim 1, wherein the step of depositing further comprises passing electrical energy through the die having a current density of about 0.016 amps/cm$^2$ or less.

14. A method according to claim 1, wherein the step of depositing further comprises passing electrical energy through the die having a current density of about 0.011 amps/cm$^2$ (10 amps/ft$^2$) or less.

15. A method according to claim 1, wherein the step of depositing a diffusing layer further comprises electrodepositing a layer of copper.

16. A method according to claim 15, wherein the step of depositing further comprises electrodepositing the layer of copper in a bath substantially free of grain refiners.

17. A method of providing diffusing risers on a fresnel lens die having a plurality of optical facets, wherein adjacent optical facets on the die are separated by a riser, the method comprising the steps of:

a) providing an electrolyte bath;

b) passing the bath through activated charcoal;

c) heating the bath to a temperature of about 30°0 C. or higher;

d) electrodepositing a diffusing layer on the plurality of optical facets and the risers, wherein the diffusing layer is chosen from the group consisting of copper, nickel, zinc, cobalt, tin, and combinations thereof, and further wherein the electrodepositing is performed by placing the die in the bath and passing electrical energy through the die having a current density of about 0.016 amps/cm$^2$ or less; and e) selectively removing the diffusing layer from the plurality of optical facets, wherein the diffusing layer remains substantially intact on the risers.

18. A method of providing diffusing risers on a fresnel lens die having a plurality of optical facets, wherein adjacent optical facets on the die are separated by a riser, the method comprising the steps of:

a) providing an electrolyte bath substantially free of grain refiners;

b) electrodepositing a diffusing layer on the plurality of optical facets and the risers, wherein the diffusing layer is selected from the group consisting of copper, nickel, zinc, cobalt, tin, and combinations thereof, and further wherein the electrodepositing is performed by placing the die in the bath and passing electrical energy through the die having a current density of about 0.016 amps/cm$^2$ or less; and c) selectively removing the diffusing layer from the plurality of optical facets, wherein the diffusing layer remains substantially intact on the risers.

19. A method according to claim 18, further comprising masking selected portions of the risers during the step of electrodepositing.

20. A method according to claim 18, further comprising masking selected portions of the risers during a portion of the time during which the step of electrodepositing is being performed.

* * * * *